(12) United States Patent
Chang

(10) Patent No.: US 7,364,338 B2
(45) Date of Patent: Apr. 29, 2008

(54) SYSTEMS FOR PROVIDING BACKLIGHT MODULE WITH STACKED LIGHT SOURCE

(75) Inventor: Chi-Hung Chang, Miao-Li Hsien (TW)

(73) Assignee: TPO Displays Corp. (TW)

( * ) Notice: Subject to any disclaimer, the term of this patent is extended or adjusted under 35 U.S.C. 154(b) by 100 days.

(21) Appl. No.: 11/392,150

(22) Filed: Mar. 29, 2006

(65) Prior Publication Data

US 2007/0230215 A1 Oct. 4, 2007

(51) Int. Cl.
*F21V 14/02* (2006.01)

(52) U.S. Cl. .................... 362/612; 362/627; 362/235; 362/600; 362/606; 362/613; 362/615; 362/610; 362/227; 362/800; 349/61; 349/62; 349/64; 349/65; 349/68

(58) Field of Classification Search ............... None
See application file for complete search history.

(56) References Cited

U.S. PATENT DOCUMENTS

| | | | | |
|---|---|---|---|---|
| 4,576,766 A | * | 3/1986 | Baskerville et al. | 264/1.32 |
| 5,652,479 A | * | 7/1997 | LoCascio et al. | 315/225 |
| 5,854,617 A | * | 12/1998 | Lee et al. | 345/102 |
| 5,876,107 A | * | 3/1999 | Parker et al. | 362/600 |
| 7,001,058 B2 | * | 2/2006 | Inditsky | 362/610 |
| 7,150,556 B2 | * | 12/2006 | Kuo | 362/613 |
| 2002/0172039 A1 | * | 11/2002 | Inditsky | 362/231 |
| 2003/0043567 A1 | * | 3/2003 | Hoelen et al. | 362/31 |
| 2004/0196643 A1 | * | 10/2004 | Terada et al. | 362/3 |

* cited by examiner

*Primary Examiner*—Sharon E. Payne
*Assistant Examiner*—Danielle Dunn
(74) *Attorney, Agent, or Firm*—Thomas, Kayden, Horstemeyer & Risley, LLP.

(57) ABSTRACT

A system for providing a backlight module has a light guide plate and at least a light source set positioned adjacent to the incident surface. The light source set contains a plurality of light sources stacking along a direction parallel with the incident surface of the light guide plate.

18 Claims, 11 Drawing Sheets
(2 of 11 Drawing Sheet(s) Filed in Color)

SYSTEMS FOR PROVIDING BACKLIGHT MODULE WITH STACKED LIGHT SOURCE

BACKGROUND OF THE INVENTION

1. Field of the Invention

The invention relates to systems for providing backlight modules.

2. Description of the Prior Art

Figure 1:
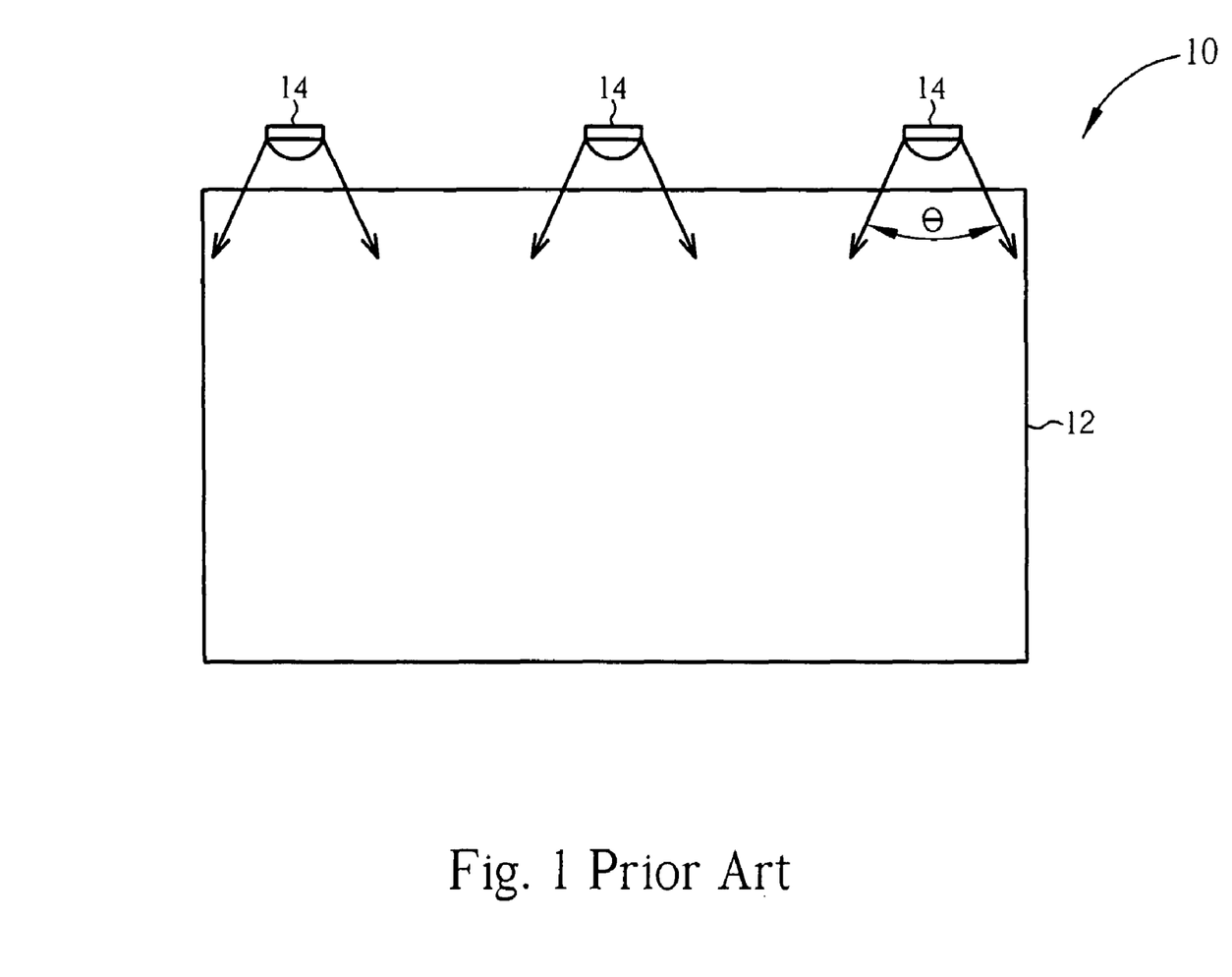
FIG. 1 is a schematic diagram of a backlight module according to the prior art.

Currently, light emitting diodes (LEDs) are developed and applied to backlight modules for replacing conventional CCFLs since LEDs have advantages of small size and low power consumption. FIG. 1 is a schematic diagram of a backlight module 10 according to the prior art. The prior art backlight module 10 includes a light guide plate 12 and a plurality of LEDs 14, wherein the LEDs 14 are positioned at one of the edges of the light guide plate (LGP) 12. Light emitted from each LED 14 appears an emitting area, as shown in the area between the arrows. The emitting area has an divergence angle θ of about 110° to 120°. As a result, some portions between the LEDs, near the edge of the light guide plate 12, are especially dark because they are out of the emitting areas of the LEDs 14.

Figure 2:
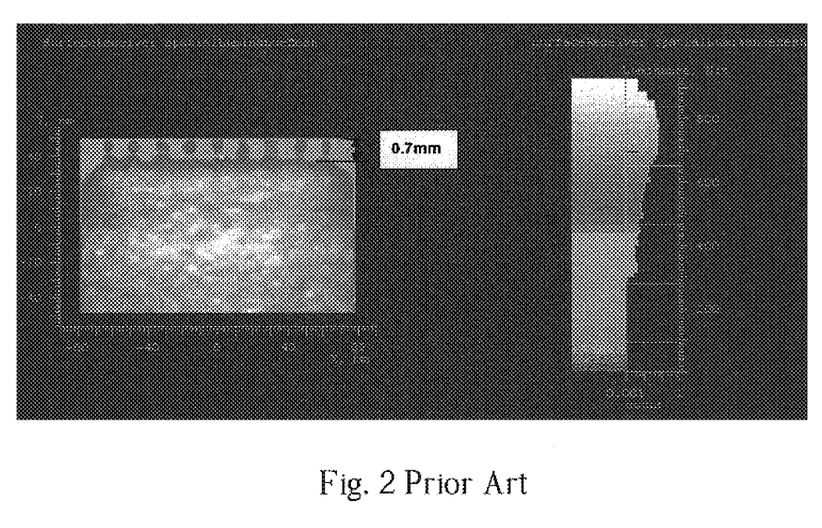
FIG. 2 is a spatial luminance diagram of a backlight module according to the prior art.

FIG. 2 is a spatial luminance diagram of a backlight module according to the prior art. The portion near the edge of the light guide plate has a clear difference between light and shade, which is called a fire-fly situation. Referring to FIG. 2, the length of the fire-fly area is about 0.7 mm, and therefore, about 0.7 mm length of the backlight module is not suitable for providing light to a display panel above the light guide plate 14, resulted in the reduction of the display area.

Therefore, to provide backlight modules, with improved fire-fly situation, which can meet the green product acquirement is still an important issue to the backlight module manufacturers.

SUMMARY OF THE INVENTION

Systems for providing backlight module with stacked light sources are provided.

An embodiment of such a system comprises a light guide plate and at least a light source set positioned adjacent to the light guide plate. The light source set comprises a plurality of light sources stacking along a direction parallel to the incident surface of the light guide plane.

Furthermore, the divergence angle of the light source set is larger than that of each of the light sources.

Another embodiment of such a system comprises a light guide plate with an incident surface and an emitting surface adjacent to the incident surface, and an array of light source set positioned with respect to an overall edge of the light guide plate. The light sources of the light source set are positioned at various height along a direction parallel to the incident surface.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

The present invention is directed to an edge-lit backlight module that is lit by an array of light source set with respect to an overall edge of the LGP, with reduced dark areas near such edge of the LGP. Accordingly, the fire-fly areas can be decreased and the performances of the backlight modules can be improved.

Figure 3:
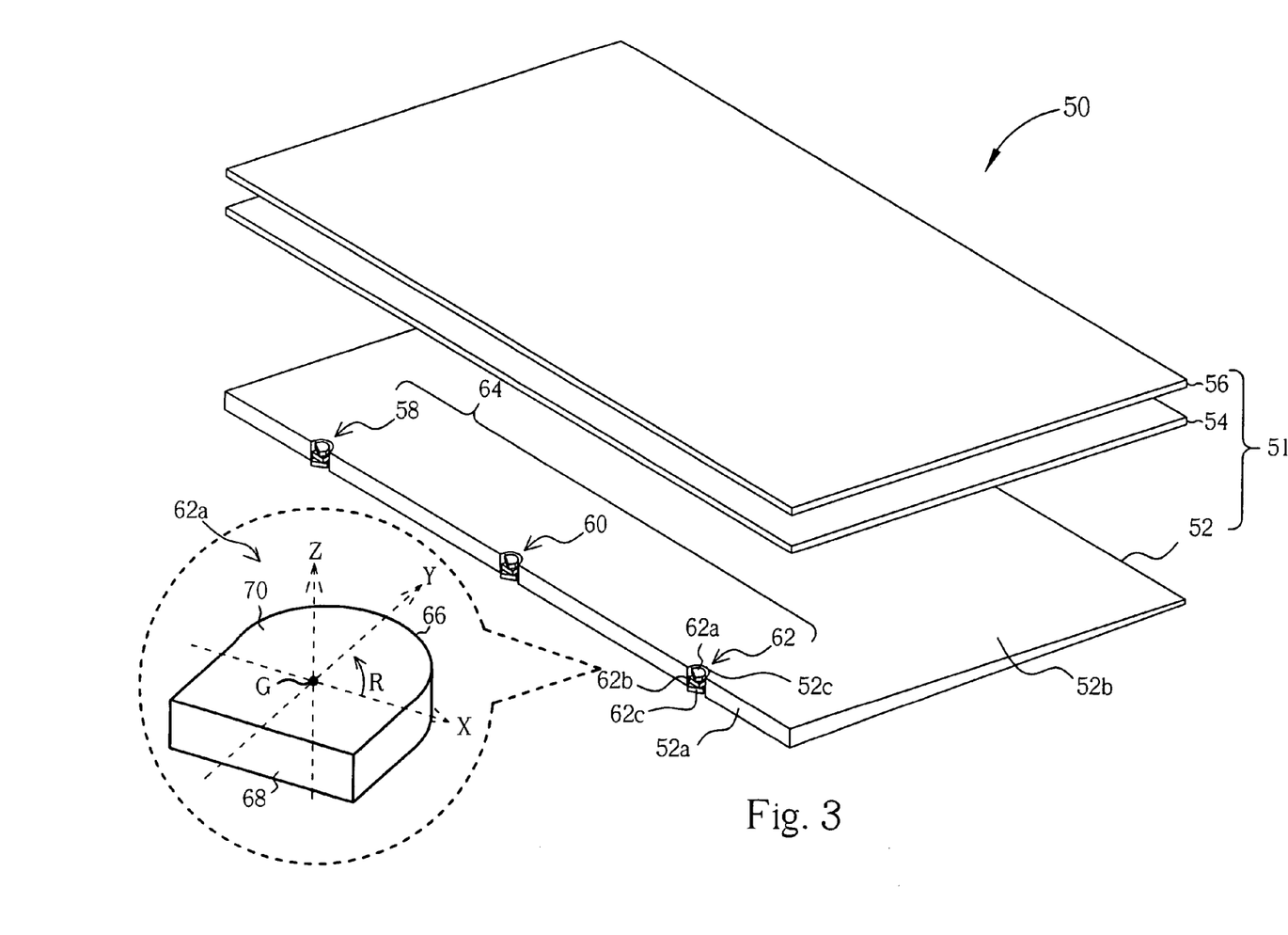
FIG. 3 is a schematic diagram of a system according to a first embodiment of the present invention.
Figure 4:
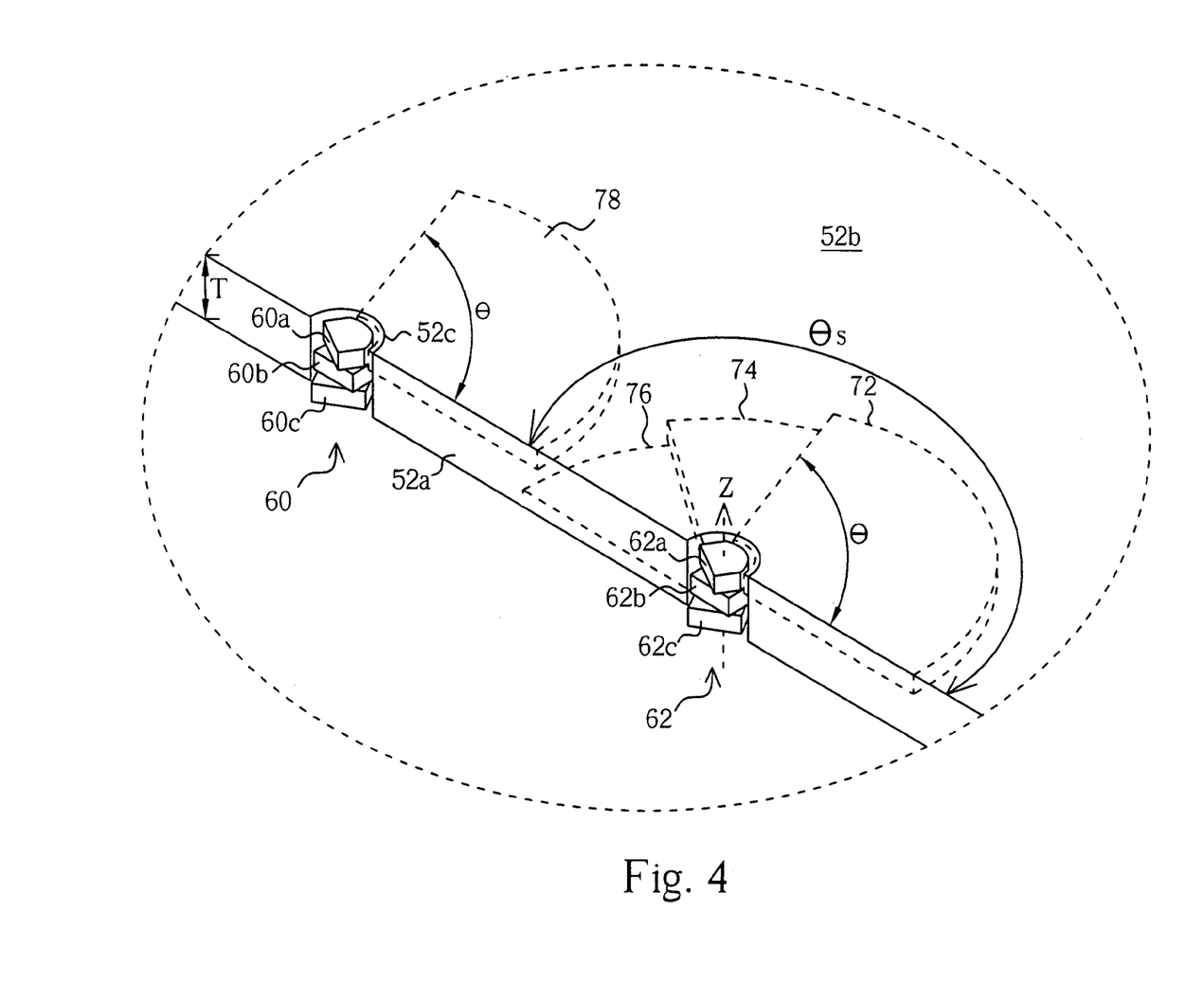
FIG. 4 is a enlarged diagram of the light source sets shown in FIG. 3.
Figure 5:
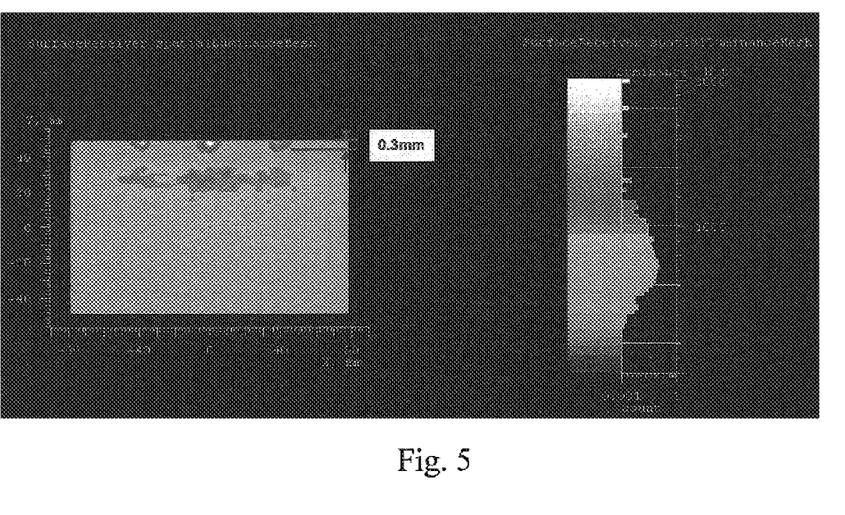
FIG. 5 is a spatial luminance diagram of the backlight module shown in FIG. 3.

With reference to the drawings, FIGS. 3-5 are schematic diagrams of a system 50 providing a backlight module 51 according to a first embodiment of the present invention. The backlight module 51 is applied to a display device, such as an LCD devices, and comprises a LGP 52, a plurality of optical films 54, 56, and a light source module 64, wherein the optical films 54 and 56 may be diffuser films or prisms. The LGP 52 has a wedge-shaped section view and comprises an incident surface 52a and an emitting surface 52b adjacent to the incident surface 52a. The light source module 64 comprises an array of light source sets 58, 60, 62 with respect to an overall edge of the LGP 52, the incident surface 52a. Each of the light source sets 58, 60, 62 comprises a plurality of stacked light sources, such as LEDs. For example, the light source set 62 includes a first LED 62a, a second LED 62b, and a third LED 62c. The first LED 62a is disposed above the second LED 62b, and the second LED 62b is sandwiched between the first LED 62a and the third LED 62c.

The enlarged illustration in the left part of FIG. 3 shows a detailed diagram of the first LED 62a. The LED 62a comprises a curved light-emitting plane 66, a rear plane 68 opposite to the light-emitting plane 66, and a top plane 70. The top plane 70, perpendicular to the incident surface 52a, has a quadrilateral shape with a curved lateral and has a geometric center G. Taking the geometric center G as the origin of a coordinate of the first LED 62a, a direction parallel with the rear plane 68 is defined as the X axis; a direction parallel with the normal of the rear plane 68 is defined as the Y axis; a direction parallel with the normal of the top plane 70 is defined as the Z axis; and a rotational axis is defined as the R axis with an anti-clockwise direction from the X axis to the Y axis. Therefore, the geometric centerline of the first LED 62a overlaps the Z axis.

Referring to FIG. 4, which is an enlarged diagram of the light source sets 60, 62. The LEDs 62a, 62b, 62c are stacked and their geometric centers G are overlapped. In other words, the LEDs 62a, 62b, 62c are stacked along the incident surface 52a. However, the LEDs 62a, 62b, 62c are partially overlapped because they dispose rotationally along the R axis. Taking the X axis of the first LED 62a as the coordinate, the second LED 62b rotates along the R axis of the first LED 62a with a first angle, and the third LED 62c also rotates along the R axis of the first LED 62a with a second angle, larger than the first angle. Therefore, although the geometric centerline Z of the three LEDs 62a, 62b, 62c are overlapped, the light-emitting plane 66 of each of the LEDs 62a, 62b, 62c are disposed toward different directions. In other words, the rear planes 68 of each of the LEDs 62a, 62b, 62c are not parallel with each other, as shown in FIG. 4. In addition, the LEDs 62a, 62b, LED 62c have an emitting area 72, an emitting area 74, and an emitting area 76 respectively, wherein each of the emitting areas 72, 74, 76 has an divergence angle θ, which is about 110° to 120°. Divergence angle θ of a light source LED in this disclosure refers to the angle of spread of light from the light source, within which the intensity at a point at any angle and at a distance from the light source is at least 70% compared to the intensity at the same distance along the light emitting axis (e.g., light emitting axis Y of the LED 62a). That is, at angles beyond the emitting areas or the divergence angle θ, the intensity at a point and at a distance from the light source would be 30% or less compared to the intensity at the same distance along an axis of output symmetry of the light source (e.g., the light emitting axis Y of the LED 62a). Since the second and third LEDs 62b, 62c are rotated from the position of the first LED 62a, the emitting areas 74 and 76 also rotate from the emitting area 72. However, the emitting areas 72, 74, 76 are partially overlapped, and the luminance of each of the overlapped portion of the emitting areas 72, 74, 76 are enhanced. In the preferable embodiment, an outer edge of the emitting area 72 is parallel with and reaches the incident surface 52a, and an outer edge of the emitting area 76 is also parallel with and reaches the incident surface 52a in another direction, i.e., the overall area of the emitting areas 72, 74, 76 has an overall divergence angle $θ_s$ of about 180°, and the divergence angle $θ_s$ of the light source set 62 is larger than the divergence angle θ of each of the first LED 62a, the second LED 62b, and the third LED 62c.

With reference to the adjacent light source set 60, the light source set 60 also comprises three stacked LEDs, the first LED 60a, the second LED 60b, and the third LED 60c, which are disposed like the first, second and third LEDs 62a, 62b, 62c. Accordingly, The highest first LED 60a rotates towards the light source set 62 and an edge of its emitting area 78 is parallel with and reaches the incident surface 52a. As a result, the emitting area 78 of the first LED 60a and the emitting area 76 of the third LED 62c overlap with each other, i.e., the overall emitting areas of the adjacent light source sets 60 and 62 are overlapped resulted in enhancing the luminance of the part of the LGP 52 between the two light source sets 60, 62. Accordingly, even the edge of the LGP 52 near the incident surface 52a may have uniform luminance since there is an overlapped area of the emitting areas of any two adjacent light source sets 58, 60, 62 according to the present invention.

In addition, on the incident surface 52a has a plurality of depressions 52c for positioning each of the light source sets 58, 60, 62. Still, taking the light source set 62 as an example, since the light-emitting planes 66 of the light sources are curved and the LEDs 62a, 62b, 62c are rotated, the depressions 52c are also curved along the light-emitting planes 66 but has a larger sectional area than that of the light-emitting planes 66. Furthermore, since the backlight module of the system 50 is applied to an LCD device which is required a small size, the total height of the stacked first, second and third LEDs 62a, 62b, 62c is equal to or smaller than the thickness T of the LGP 52.

Referring to FIG. 5, the spatial luminance diagram of the backlight module of the present invention system 50 is shown. The three points with about 1500 nits represent the three light source sets 58, 60, 62. Since the part of the LGP 52 in the position between any two of the light source sets 58, 60, 62 has an enhanced luminance, the fire-fly area is obviously decreased and only has 3 mm from the top edge, the incident surface 52a, of the LGP 52.

It should be noted that the number of the light sources of each light source set might be various, and the rotation angles of the light sources in each light source set can be different, too. For example, the light source set 60 shown in FIG. 4 can selectively only have the first LED 60a and the third LED 60c without the second LED 60b while the light source set 62 only has the third LED 62c and the first LED 62a or the second LED 62b. The main spirit of the present invention is that the light sources are stacked, partially overlapped or directly overlapped, and disposed in a rotation manner so that the overall emitting area of an light source set is overlapped by that of an adjacent light source set. However, the height position and rotation of each light sources and the pitch between two adjacent light source sets are various according to the design and pattern of light guide plates and the applied panel displays.

Figure 6:
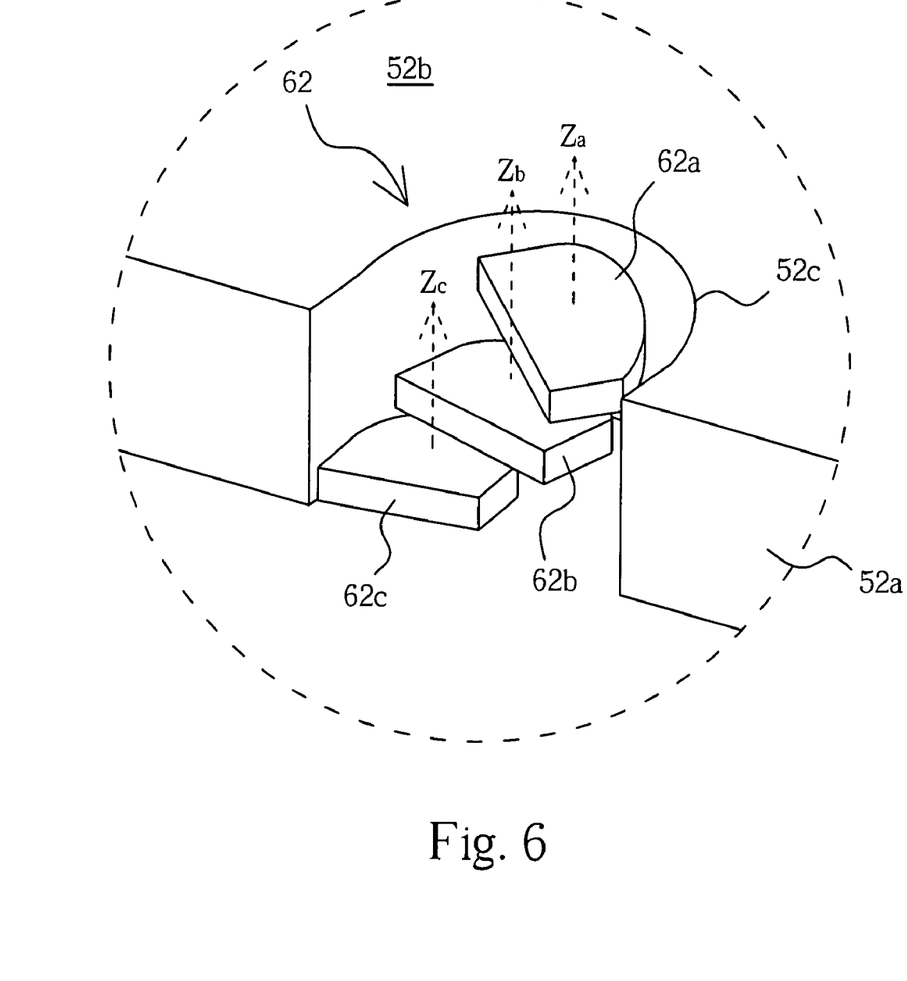
FIG. 6 is an enlarge diagram of a light source set of a second embodiment of the present invention.
Figure 7:
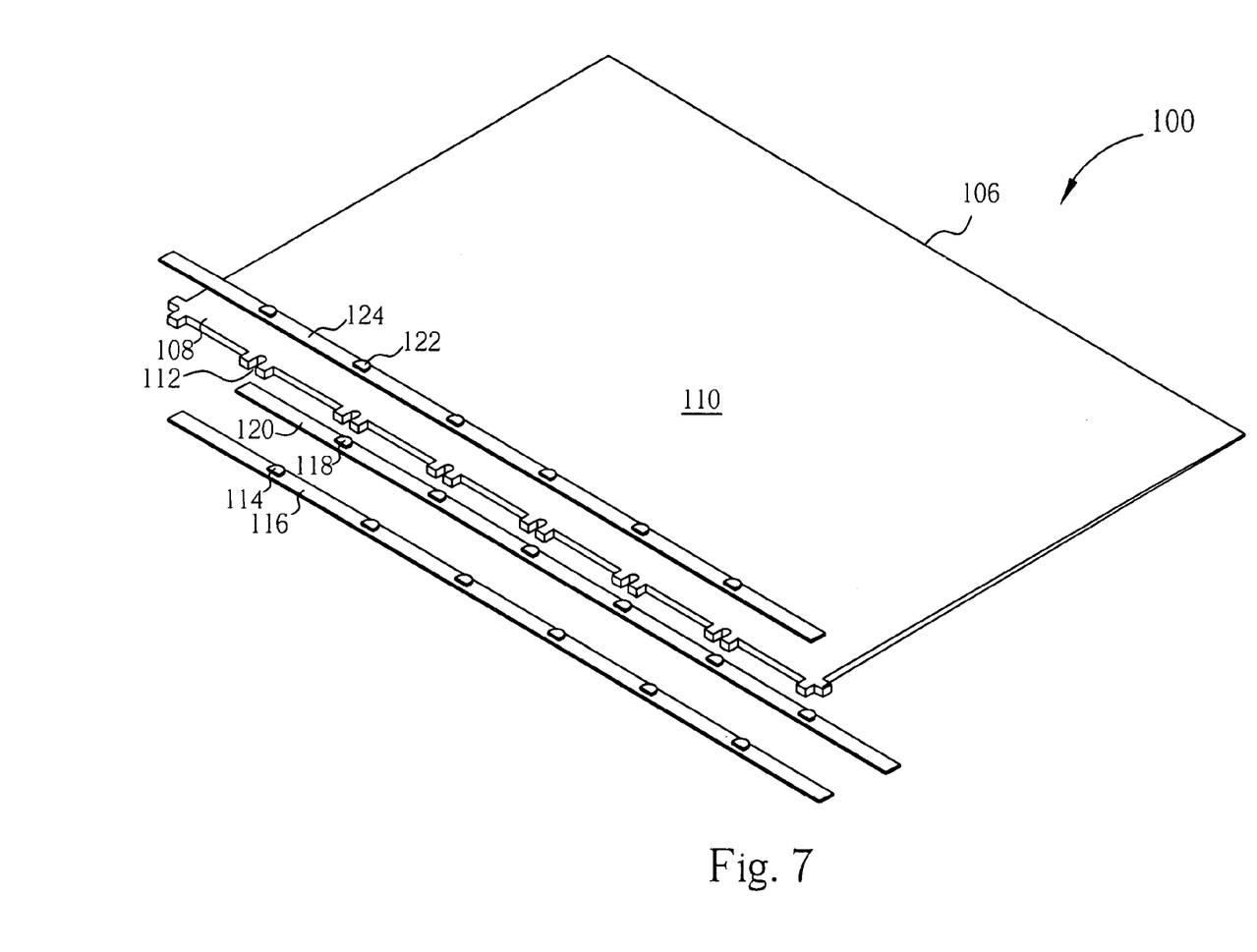
FIG. 7 is a schematic diagram of a system according to a third embodiment of the present invention.

FIG. 6 is an enlarge diagram of a light source set 62 of a second embodiment of the present invention. For convenient illustration in FIG. 6, similar components retain the same label numbers that were used in FIG. 3. The light source set 62 comprises three stacked light sources, the first LED 62a, the second LED 62b, and the third LED 62c. However, the LEDs 62a, 62b, 62c are partially overlapped and rotated towards various directions. As shown in FIG. 6, the geometric centerline $Z_a$ passing through the geometric center of the first LED 62a, the geometric centerline $Z_b$ of the second LED 62b, and the geometric centerline $Z_c$ of the third LED 62c are not positioned at a same point. In another word, the geometric centers of the first, second and third LEDs 62a, 62b, 62c are not overlapped. Accordingly, the emitting areas of the LEDs 62a, 62b, 62c can be shifted for making a fine tuning of the luminance of the LGP 52.

With reference to FIGS. 7-11, FIGS. 7-11 are schematic diagrams of the system providing a backlight module 100 according to a third embodiment of the present invention.

Figure 8:
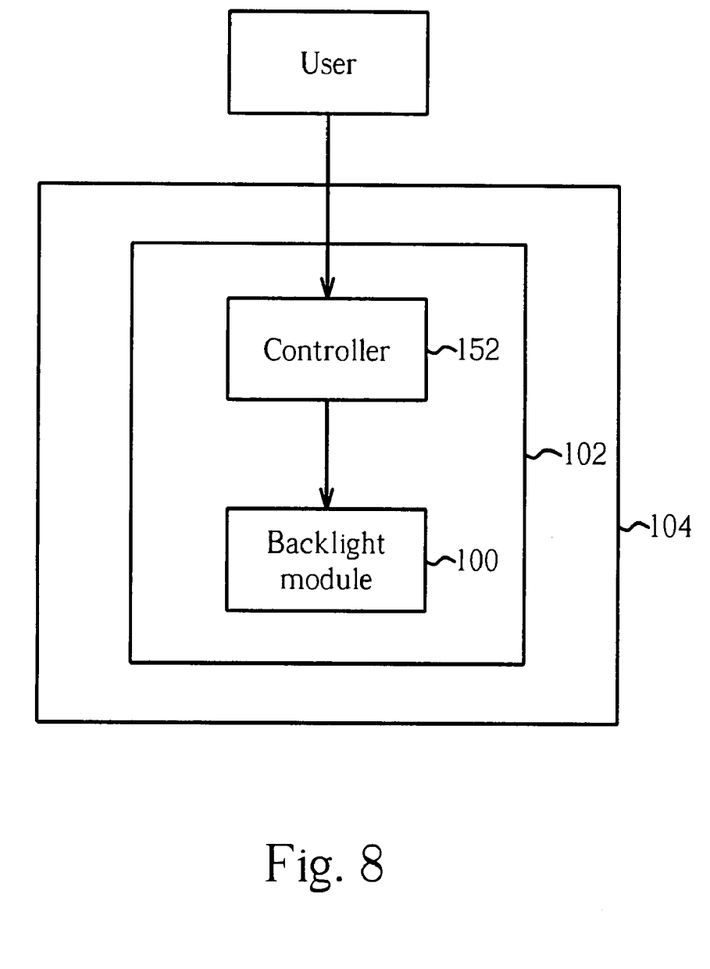
FIG. 8 is a schematic diagram illustrating an electronic device incorporating the system shown in FIG. 7.

FIG. 8 shows that the backlight module 100 can be incorporated into a display device 102, such as an LCD device, and controlled by a controller 152 coupled to the backlight module 100. Furthermore, the display device 102 can form a portion of a variety of electronic devices, represented by the numeral 104, such as a laptop computer, a mobile phone, a digital camera, a personal digital assistant (PDA), a desktop computer, a television, a car display or a portable DVD player. Therefore, a user of the display device 102 may control the electronic device 104 through the controller 152 to operate the backlight module 100. The backlight module 100 comprises a LGP 106 and a plurality of light sources. The light sources are LEDs, such as the LEDs 114, 118, 122, set on three different light source bases 116, 120, 124, wherein the LEDs 114, 118, 122 are preferably side-view LEDs, and the light source bases 116, 120, 124 are flexible printed boards (FPC). The LGP 106 comprises an incident surface 108 and an emitting surface 110.

Figure 9:
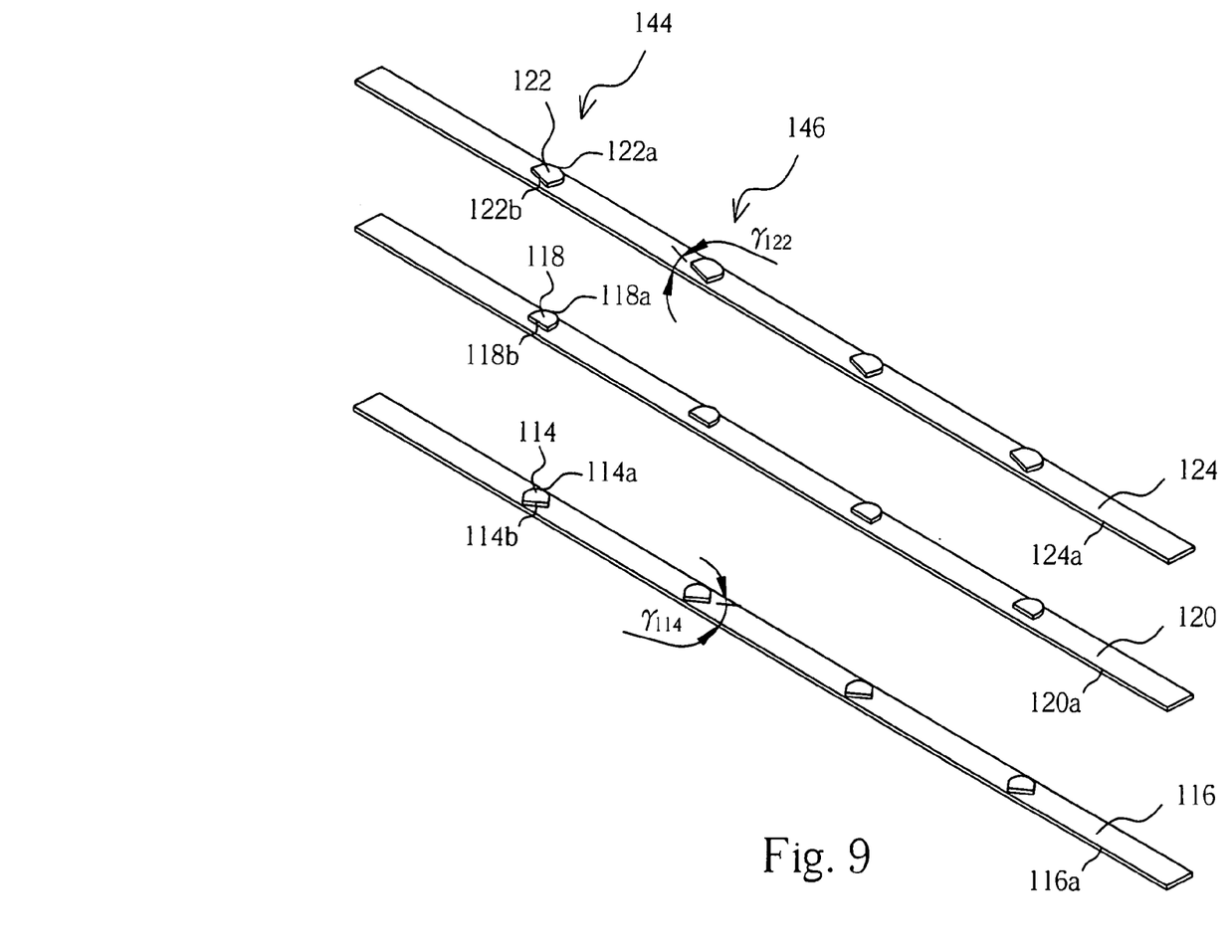
FIG. 9 is an enlarged view of the light source bases and the LEDs shown in FIG. 7.

Please refer to FIG. 9, which is an enlarged view of the light source bases 116, 120, 124 and the LEDs 114, 118, 122. The first LED 114 from the left on the light source base 116 corresponds to the first LED 118 from the left on the light source base 120 and to the first LED. 122 on the light source base 124, and the three corresponding LEDs 114, 118, 122 form a first light source set 144. Similarly, the second LEDs 114, 118, 122 form a second light source set 146, and so forth. The LEDs 114, 118, 122 comprise a light-emitting plane 114a, 118a, 122a and a rear plane 114b, 118b, 122b opposite to the light-emitting planes 114a, 118a, 122a respectively. The LEDs 114, 118, 122 are rotated towards different directions. In this embodiment, the rear planes 114b of the LEDs 114 on the lowest light source base 116 are not parallel with the lateral 116a of the light source base 116, and have included angles $y_{114}$ with the lateral 116a; the rear plane 118b of the first LED 118 is parallel with the lateral 120a of the light source base 120; and the rear planes 122b of the LEDs 122 have an included angle $y_{122}$ with the lateral 124a of the light source base 124. However, according to the various patterns of the LGP 106, the included angles $y_{114}$ of all the LEDs 114 may be various, and the included angles $y_{122}$ may be various, too.

Furthermore, the rear planes 118b of the LEDs 118 other than the first one may still have an included angle more than 0° with the lateral 120a.

Figure 10:
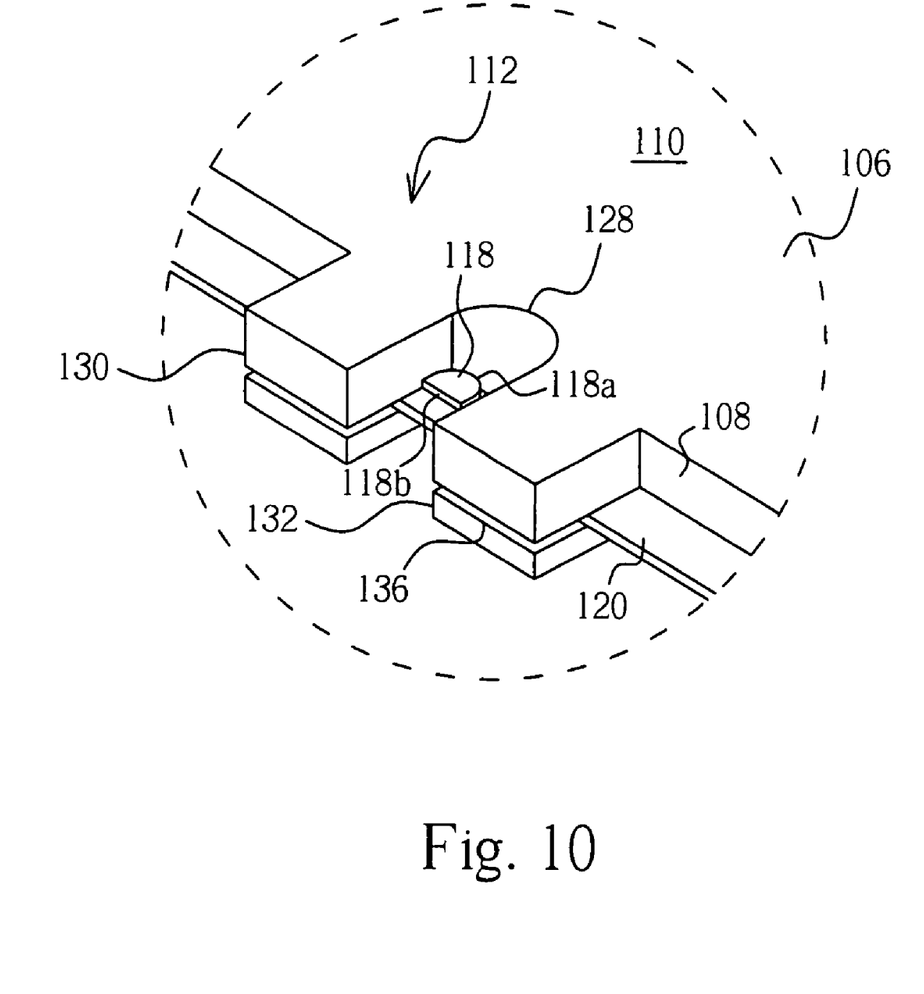
FIGS. 10-11 are enlarged diagrams of a light source seat shown in FIG. 7.

In addition, there are pluralities of light source seats 112 for the LEDs 114, 118, 122, wherein each light source seat 112 corresponds to one light source set, such as the light source set 144. FIG. 10 shows an enlarged diagram of a light source seat 112 shown in FIG. 7. The light source seat 112 comprises two protrusions 130, 132 and a depression 128. The depression 128 has a curved lateral for positioning the LEDs 114, 118, 122 with the curved light-emitting planes 114a, 118a, 122a. For positioning the LEDs 114, 118, 122 on the light source bases 116, 120, 124, each of the protrusions 130, 132 has at least a seam 136 along the incident surface 108 and parallel with the emitting surface 110. For example, the light source base 120 may be disposed into the seam 136 and sandwiched by the protrusions 130, 132, such that the LEDs 118 on it can be just set into the depression 128.

On the other hand, the light source base 116 can be adhered onto the bottom surface of the light source seat 112 for setting the LEDs 114 by a glue or adhesive while the light source base 124 can also be adhered onto the top surface of the light source seat 112 upside down for setting the LEDs 122 in the depressions 128.

Figure 11:
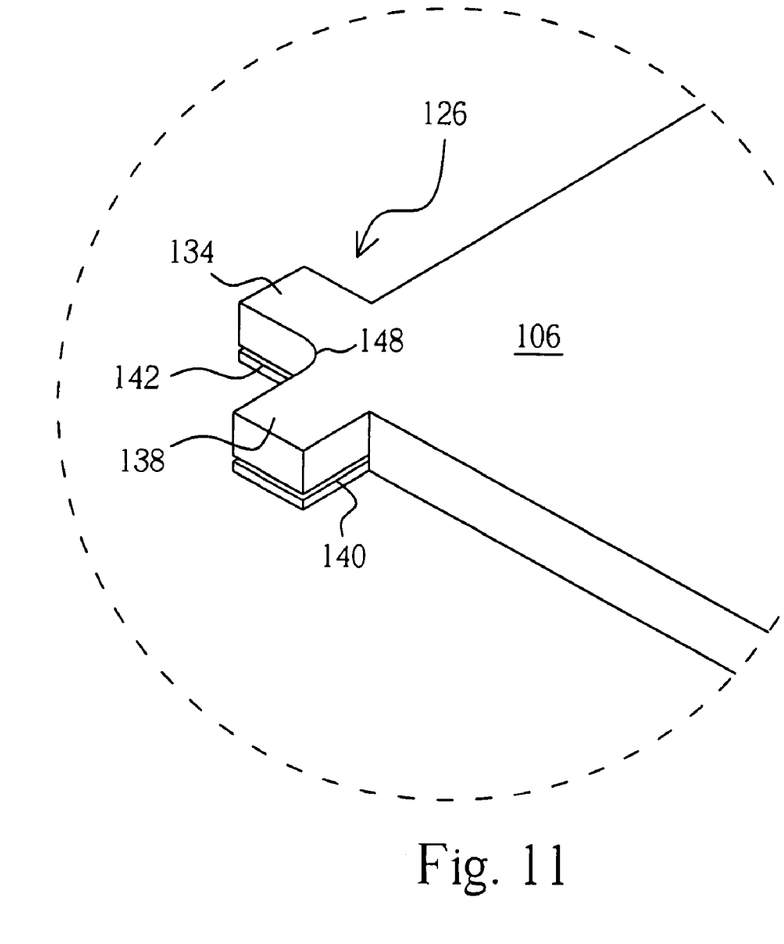

An enlarged diagram of another kind of the light source seat is shown in FIG. 11, which illustrates the light source seat 126 positioned at the corner of the LGP 106. The light source seat 126 comprises two protrusions 134 and 138 that are protrudent from the sidewall of the LGP 106, towards different directions. In this embodiment, the protrusion 134 is perpendicular to the protrusion 138. Both of the protrusions 134, 138 selectively comprise a seam 140, 142 for disposing the light source base 120. The light source seat 126 further comprises a depression 148 for fixing and positioning the light sources. Therefore, one or more LEDs can be positioned in the depression 148 to emit light from the corner of the LGP 106 for adjusting the luminance uniformity.

In contrast to the prior art, the present invention provides systems with backlight modules having stacked and rotated light sources. Accordingly, the overlapped emitting areas of the rotated light sources overcome the fire-fly situation through decreasing the fire-fly area and enhance the brightness, such that a luminance with high uniformity and brightness of the backlight module is provided. Furthermore, since LEDs are employed as the light sources, it may have a longer lifetime than the prior art backlight module taking CCFLs as the light sources. As a result, the present invention system providing a backlight module has a low operating temperature and a low storage temperature, and meets the green product acquirement.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A system for providing a backlight module with stacked light sources comprising:
   a light guide plate comprising a incident surface; and
   at least a light source set positioned adjacent to the light guide plate, the light source set comprising a plurality of light sources stacked along a direction parallel to the incident surface of the light guide plate, each of the light sources comprising a top plane perpendicular to the incident surface, and the light sources being rotationally disposed along an axis parallel with the normal of the top planes.

2. The system as claimed in claim 1, wherein the divergence angle of the light source set is larger than the divergence angle of each of the light sources.

3. The system as claimed in claim 1, wherein each of top planes has a geometric center, the geometric centers of the light sources being overlapped with each other.

4. The system as claimed in claim 1, wherein each of the top planes has a geometric center, the light sources being partially overlapped so that the geometric centers of the light sources are not overlapped with each other.

5. The system as claimed in claim 1, wherein an overall area of the emitting areas of all the light sources of the light source set has an overall divergence angle of about 180°.

6. The system as claimed in claim 1, wherein the backlight module comprises two of the light source sets side by side on the incident surface, an overall area of the emitting areas of one of the light source sets partially overlaps an overall area of the emitting areas of another one of the light source sets.

7. The system as claimed in claim 1, wherein the light guide plate comprises a depression for positioning the light source set.

8. The system as claimed in claim 7, wherein each of the light sources comprises a curved light-emitting plane, and the depression is cured along the curved light-emitting planes of the light source.

9. The system as claimed in claim 1, wherein each of the light sources is fixed on a light source base, and the light guide plate comprises at least a seam for disposing one of the light source bases.

10. The system as claimed in claim 9, wherein the light guide plate further comprises at least a light source seat for disposing the light source set, the light source seat comprises two protrusions and a depression positioned between the two protrusions, and the seam is located in the protrusions.

11. The system as claimed in claim 1, wherein the incident surface has a thickness, and the total height of the stacked light sources is less than or equal to the thickness of the incident surface.

12. The system as claimed in claim 1, wherein the system further comprises:
   a display device comprising the backlight module; and
   a controller coupled to the backlight module, the controller being operative to control the backlight module.

13. The system as claimed in claim 12, wherein the system further comprises an electronic device comprising the display device, and the electronic device is a laptop computer, a mobile phone, a digital camera, a personal digital assistant (PDA), a desktop computer, a television, a car display or a portable DVD player.

14. A system for providing a backlight module comprising:
 a light guide plate comprising an incident surface and an emitting surface adjacent to the incident surface; and
 an array of light source set positioned with respect to an overall edge of the light guide plate, the light source set comprising a plurality of light sources positioned at various height along a direction parallel to the incident surface, and the light sources being rotationally disposed along an axis parallel with the normal of the emitting surface.

15. The system as claimed in claim 14, wherein some of the light sources are stacked along the normal of the emitting surface.

16. The system as claimed in claim 15, wherein the stacked light sources are partially overlapped.

17. The system as claimed in claim 14, wherein the light guide plate further comprises at least a light source seat for positioning the light sources.

18. The system as claimed in claim 17, wherein the light source seat comprises a depression and at least a protrusion at the incident surface.

* * * * *